United States Patent
Katchka

[15] 3,704,854
[45] Dec. 5, 1972

[54] FLOW CONTROL DEVICE WITH PRESSURE REGULATION

[72] Inventor: Jay R. Katchka, Long Beach, Calif.

[73] Assignee: Robertshaw Controls Company, Richmond, Va.

[22] Filed: Sept. 9, 1970

[21] Appl. No.: 70,812

Related U.S. Application Data

[62] Division of Ser. No. 740,150, June 26, 1968.

[52] U.S. Cl. ..................................251/61.2, 251/333
[51] Int. Cl. .......................F16k 25/00, F16k 31/145
[58] Field of Search.........251/61, 45, 333, 61.5, 61.2

[56] References Cited

UNITED STATES PATENTS 3,276,465  10/1966  Wyckoff...............251/61.5 X

FOREIGN PATENTS OR APPLICATIONS 1,227,296  10/1966  Germany...............251/333

*Primary Examiner*—Arnold Rosenthal
*Attorney*—Brenner, O'Brien & Guay

[57] ABSTRACT

A flow control device having a manually operable valve movable between a plurality of controlling positions for delivering fluid flows to main and pilot outlets; a pressure regulator assembly downstream of the manually operable valve regulates the pressure of the pilot flow as well as the main flow and the manually operable valve selectively permits the pilot flow to bypass the pressure regulator. Upstream of the pilot flow outlet the pilot flow line is provided with restricting orifices to prevent an excess of a non-regulated pilot flow and to dampen a regulated pilot flow as is necessary during initial compensation of the regulator.

2 Claims, 7 Drawing Figures

PATENTED DEC 5 1972

INVENTOR
JAY R. KATCHKA

BY Brenna, O'Brien, Gray & Connors
ATTORNEYS

INVENTOR
JAY R. KATCHKA 3,704,854

FLOW CONTROL DEVICE WITH PRESSURE REGULATION

CROSS-REFERENCE TO RELATED APPLICATIONS

This is a divisional application of copending application Ser. No. 740,150 filed June 26, 1968.

BACKGROUND OF THE INVENTION

1. Field of the Invention

The present invention relates to fluid flow control devices and, in particular to such a control device for controlling a fluid flow and for regulating the pressure of the fluid flow by a combined arrangement.

2. Description of the Prior Art

It is conventional in the art to control a fluid flow and to regulate the pressure of the fluid flow as when the fluid flow is fuel gas that is required to be supplied to gas burner apparatus at a predetermined pressure in accordance with the capacity of such burner apparatus. Recent developments have shown that it is desirable to regulate the pressure of the pilot flow as well as the main flow of fuel gas. A particular problem associated with such an arrangement is the possibility of an excessive pilot flow when a non-regulated pilot flow is utilized during pilot burner ignition.

SUMMARY OF THE INVENTION

It is, therefore, an object of the present invention to prevent an excessive pilot flow in a control device having pressure regulation.

Another object of this invention is to dampen the pressure regulated flow in a control device during initial compensation of its pressure regulator.

This invention has another object in that a control device having pressure regulation of main and pilot flow of fuels, is provided with a non-regulated pilot flow for ignition purposes at a pilot burner.

The present invention has another object in that a flexible valve face member in a pressure regulator enhances pressure regulation at a low flow capacity.

A further object of this invention is to provide a rotary type plug valve with a pressure regulator having an atmospheric pressure chamber which is vented to the atmosphere in accordance with the rotary position of the plug valve.

In practicing the present invention, a flow control device is provided with a casing having an inlet, a main outlet and a pilot outlet, a pressure regulator to regulate the pressure of fluid flows to the main and pilot outlets, a flow restrictor means controlling a non-regulated pilot flow to prevent an excess of such flow to the pilot outlet, and means to bypass such flow restrictor means when delivering a regulated pilot flow to the pilot outlet.

Other objects and advantages of the present invention will become apparent from the following description of a preferred embodiment taken in conjunction with the accompanying drawings.

DESCRIPTION OF PREFERRED EMBODIMENTS

Figure 1:
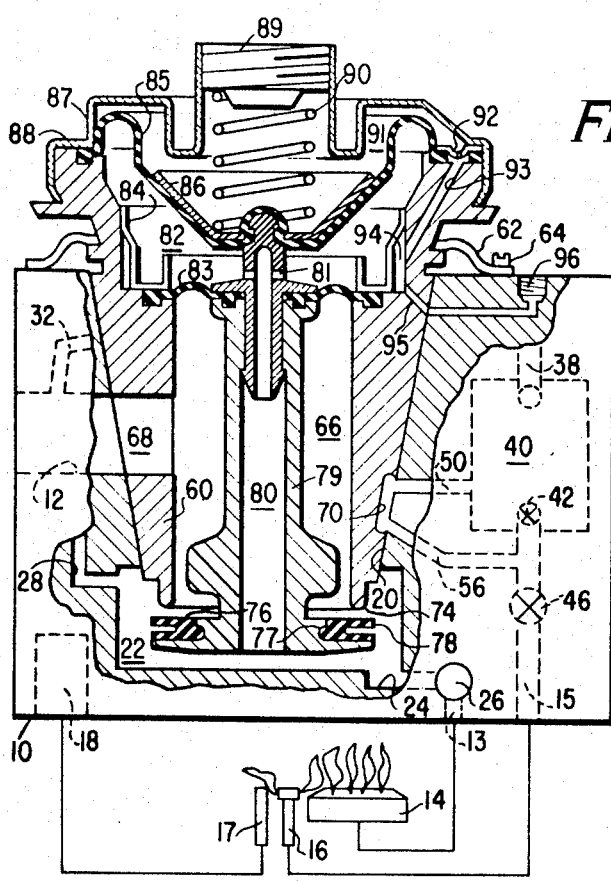
FIG. 1 is a front elevation of a control device embodying the present invention with parts broken away to illustrate a detailed section on an enlarged scale.
Figure 2:
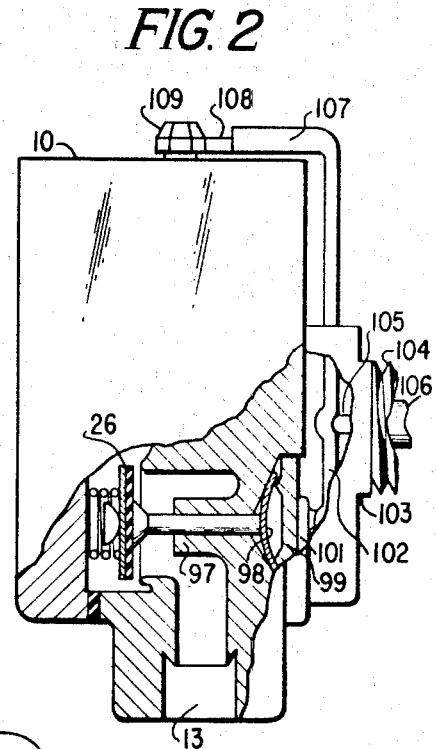
FIG. 2 is a side elevation of the control device of FIG. 1 with parts broken away and parts in section.

As is illustrated in FIGS. 1 and 2, the present invention is embodied in a thermostatic control device for fuel burner apparatus. The control device casing, indicated generally at 10, has an inlet 12 adapted for connection to a source of fuel such as a gas main (not shown), a main flow outlet 13 connected by a suitable conduit to a main burner 14, and a pilot flow outlet 15 connected by a conduit to a pilot burner 16 which is disposed in igniting proximity to the main burner 14. A flame responsive element, such as a thermocouple 17 is disposed in the flame of pilot burner 16 and is connected by a cable to an automatic safety device 18, such as an electromagnetic holding valve (not shown) which is conventionally known in the art and which is disposed to control the inlet 12.

The top of casing 10 is formed with a truncated conical bore 20 that intersects the inlet port 12 and defines a seat for a manual plug valve to be described more fully hereinafter. The bottom of bore 20 opens into an outlet pressure chamber 22 from which a main flow passageway 24 leads to a thermostatically operated valve, indicated generally at 26, which controls the fluid flow to the main outlet 13. A pilot flow passage 28 also extends from the chamber 22 to a pilot flow port 30 which opens into the conical bore 20 at a location axially and radially spaced from the inlet port 12. A second pilot flow passage 32 has one end communicating with the inlet port 12 and an opposite end terminating in a second pilot flow port 34 that opens into the conical bore 20 at the same axial level of the first pilot flow port 30 but being radially spaced therefrom as well as from the inlet port 12. A third pilot flow port 36 opens into the conical bore 20 at the same axial level as the first and second ports 30 and 34 and being spaced therebetween.

Figure 4:
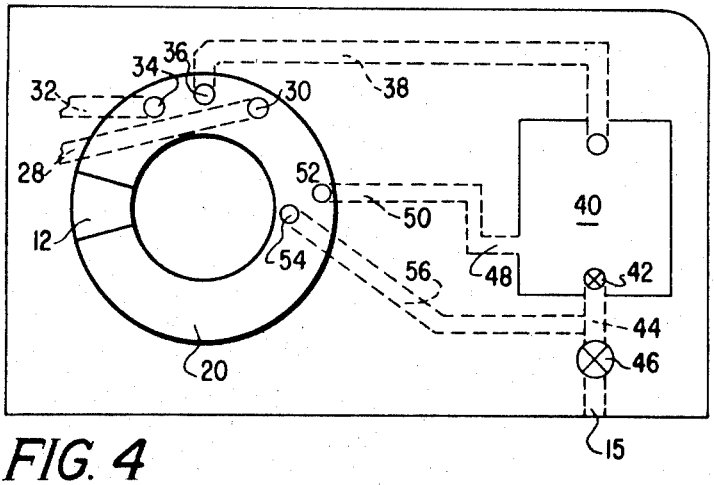
FIG. 4 is a schematic top view of the cavity portion which receives the plug valve of FIG. 3 with dashed lines to indicate the flow passages.
Figure 3:
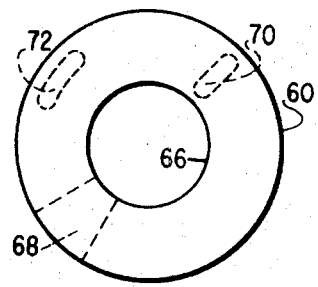
FIG. 3 is a schematic top view of a manually rotatable plug valve utilized in FIG. 1.

As is illustrated in FIG. 4, the third pilot flow port 36 defines one end of a pilot flow passageway 38, the opposite end of which communicates with a filter cavity 40. A flow restricting orifice defines an orificed outlet 42 from the filter cavity 40, which communicates with a restricted pilot flow passageway 44 leading to a second flow restricting orifice 46, the downstream side of which communicates with the pilot flow outlet 15. An unrestricted outlet 48 from the filter cavity 40 leads to a pilot flow passageway 50 that terminates in a port 52 opening into the conical bore 20 at a location axially and radially spaced from the other parts therein. Slightly spaced from the port 52, another port 54 defines one end of a pilot flow passageway 56, the opposite end of which communicates with the passageway 44 between the two restricting orifices 42 and 46.

A manually rotatable plug valve 60 has a conical portion conforming to the conical bore 20 and is rotatably seated therein. An annular spring retainer plate 62 secured to the top wall of casing 10 by suitable fastening means, such as cap screws 64, resiliently engages an annular shoulder radially projecting from the plug valve 60 to retain the same in the conical bore 20. The central portion of the plug valve 60 is hollowed out to define a chamber 66, the inlet of which is formed by a transverse circular opening 68 in the conical wall of the plug valve 60 so as to register with the inlet passage 12. Axially and radially spaced from the inlet opening 68, the conical wall of the plug valve 60 has a peripheral groove 70 of sufficient length to span the distance between the ports 52 and 54 whereby communication is established therebetween whenever the plug valve 60 is rotated to its "on" position. A second peripheral groove 72 in the conical wall of the plug valve 60 is axially and radially spaced from the groove 70 and inlet opening 68 in a location to cooperate with the conical bore ports 30, 34 and 36. The arcuate length of the groove 72 is greater than the arcuate distance between the conical bore ports 34 and 46, which arcuate distance is the same as that between the conical bore ports 36 and 30. The groove 72 spans the conical bore ports 34 and 36 when the plug valve 60 is in its "pilot" position and spans the conical bore ports 36 and 30 when the plug valve 60 is in its "on" position. The greater arcuate length of the peripheral groove 72 defines an overlap whereby during rotation of the plug valve 60 between its "pilot" position and its "on" position, there is no interruption of a pilot flow of fuel to the pilot burner 16.

As is shown in FIG. 1, the opened bottom wall of the plug valve 60 has an annular valve seat 74 which forms an outlet for the chamber 66 and which leads to the outlet chamber 22. The main flow from the chamber 66 is regulated by pressure regulating means including a valve member 76 disposed downstream of the valve seat 74 for cooperation therewith. The valve member 76 is made of suitable flexible material, such as a silicone rubber, in the form of an annular ring having a retaining rib 77 on its inner periphery and having an annular edgewise undercut or groove on its outer periphery which thus presents a flexible lip 78 disposed adjacent the valve seat 74. The valve member 76 is mounted on the end of a valve stem 79 with its retaining rib 77 being disposed in a cooperating groove formed in the valve stem 79. A longitudinal bore 80 in the valve stem 79 has a lower port opening into the outlet chamber 22 and an upper transverse port 81 opening into a pressure chamber 82. The bottom wall of chamber 82 is defined by a flexible balancing diaphragm 83 which also defines the upper wall of the inlet chamber 66. The outer periphery of the diaphragm 83 is secured to the plug valve wall by means of an annular cup-shaped retainer 84 which has an enlarged upper rim press fitted and sealed against adjacent wall portions of the plug valve; the inner periphery of the diaphragm 83 is secured to the valve stem 79 by means of an extension plug which embodies the transverse slot 81 and which includes an enlarged head defining a mounting for the center portion of a flexible regulating diaphragm 85. A cup-shaped diaphragm pan 86 has a center aperture whereby the pan 86 is snap fitted over the diaphragm center and over the enlarged head of the extension plug. The outer periphery of diaphragm 85 is secured to the plug valve by a cover 87 having an annular flange 88 clamped against the diaphragm periphery by means of the flange end which is rolled on or crimped over an annular shoulder on the plug valve 60. The cover 87 centrally carries an adjustment screw 89 and a coil spring 90 mounted in compression between the diaphragm pan 86 and the adjustment screw 89 is adjusted thereby for selectively fixing the biasing force acting on the regulating diaphragm 85.

The space between the cover 87 and the regulating diaphragm 85 defines an atmospheric pressure chamber 91 that communicates with the atmosphere through a bleed line including a restricting orifice 92 clamped over a suitable opening in the periphery of diaphragm 85 by the cover flange 88, a bleed passage 93 in the plug valve body, an annular chamber 94 between the lower portion of the retainer 84 and the adjacent wall of the plug valve body, an atmospheric port 95 in the plug valve body and an outlet bleed passage 96 that is vented to the atmosphere. The atmospheric port 95 is in registry with the passage 96 in all positions of the plug valve 60; the port 95 thus has an arcuate groove assuring such registry when the plug valve 60 is in its "on" position, its "pilot" position and its "off" position.

The thermostatically operated valve 26 may take any suitable form such as illustrated in FIG. 2, which includes a coil spring biasing the valve member toward an annular valve seat; a valve stem protrudes centrally from the valve member and slidably extends through a bored boss 97 on the rear wall of casing 10. The end of valve stem protrudes into a counterbore on the rear wall of casing 10, which houses a snap acting mechanism comprising a bowed snap disc 98 mounted on the annular knife edged fulcrum of a relatively thick disc which is movable in such counterbore. Such snap acting mechanisms are well known in the art and may have any suitable construction.

The snap acting mechanism is actuated by a thrust button 101 carried on the end of a lever 102 that is carried by a mounting shank 103. The shank 103 is secured to the rear wall of casing 10 as by threaded cap screws (not shown) and includes an externally threaded boss 104 for attaching the entire control device to a heating appliance, such as the tank of a hot water heater. A thermostatic unit of any suitable type, such as an inner rod 105 of Invar or the like and an outer concentric tube 106 of copper or the like is carried by the boss 104 so that the inner end of the rod 105 engages an intermediate portion of the lever 102; such a rod and tube thermostat is so well known that further description is unnecessary. The lever 102 protrudes out of a guide slot in the mounting shank 103 and has a perpendicularly bent end 107 which lies over the top of casing 10 (FIG. 2). The lever end 107 is engaged by a rotatable cam 108 secured to the stem of a temperature setting dial 109.

The thermoelectric safety device 18 and the thermostatically operated snap acting valve means are conventional structures in the art and complete descriptions thereof are found in U.S. Pat. No. 2,953,937.

The plug valve cover 87 is provided with suitable indicia (not shown) to indicate "off," "pilot" and "on" positions of the plug valve 60. With the plug valve dial cover 87 in its "off" position, the tapered wall of the plug valve 60 closes off the inlet 12 and the pilot flow passage 32 so there is no fuel flow to either the main burner 14 or the pilot burner 16. To initiate operation of the burner apparatus, the plug valve cover dial 87 is rotated from its "off" position to its "pilot" position whereby the main flow port 68 is still out of registry with the inlet 12 but the pilot flow groove 72 establishes communication between the ports 34 and 36. Thus, a pilot flow of fuel, which is non-regulated since it bypasses the pressure regulator assembly, proceeds through the port 36, the passageway 38, the filter cavity 40, the smaller restrictor 42, the passageway 44, the larger restrictor 46, the pilot flow outlet 15 and the conduit leading to the pilot burner 16; with the thermoelectric safety device 18 being held in its reset position as is well known in the art, the fuel from the pilot burner 16 is ignited as by a match. As soon as the pilot burner flame sufficiently heats the thermocouple 17, the safety device 18 may be released and the safety valve therein will be retained in its open position.

Figure 5:
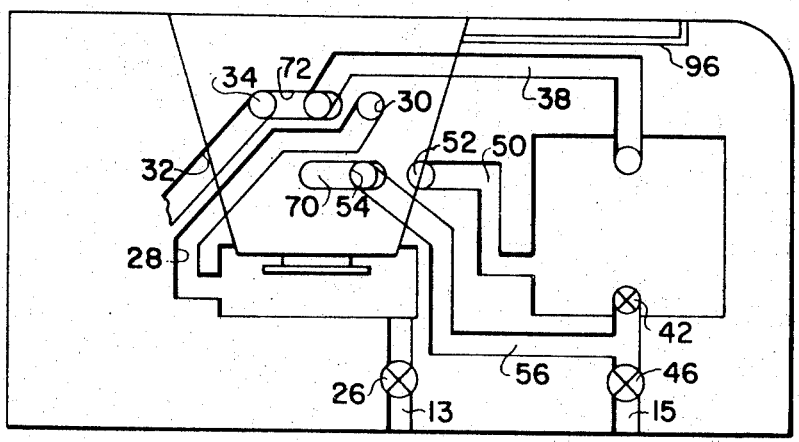
FIG. 5 is a schematic composite of FIGS. 3 and 4 showing the plug valve in its "pilot" position.
Figure 6:
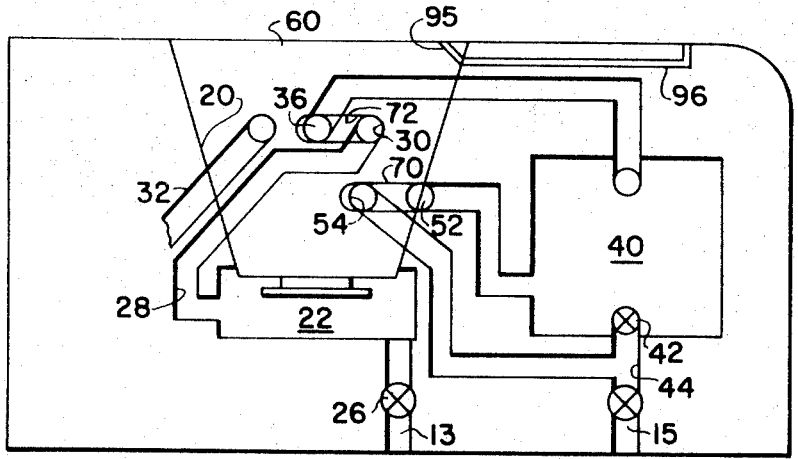
FIG. 6 is a schematic composite similar to FIG. 5 but showing the plug valve in its "on" position.

As is illustrated in FIG. 5, when the plug valve 60 is in its "pilot" position, there is no communication between the pilot flow passageways 50 and 56 because the valve plug groove 70 is not in registry with the ports 52 and 54. Thus, the entire pilot flow of fuel is subject to the restricted flow of the smaller restricting orifice 42. This arrangement prevents overgassing of the pilot burner 16 during the lighting thereof and has the particular advantage of safety to the person applying the match to the pilot burner in restricting the non-regulated pilot flow to a limit that precludes dangerous combustion. The limited non-regulated pilot flow prevents an excess of the pilot flow of fuel being consumed at the pilot burner as during the off season time of the year when the main burner 14 is not in service.

Additional rotation of the plug valve dial cover 87 from its "pilot" position to its "on" position brings the plug valve port 68 into registry with the inlet 12 while the atmospheric bleed line port 95 is in continuous registry with the atmospheric line outlet 96; the peripheral groove 70 into registry with the pilot flow ports 52 and 54; and, the peripheral groove 72 into registry with the pilot flow ports 36 and 30. During such rotation, there is no interruption of the pilot flow of fuel because the overlap provided by groove 72 is sufficient to establish the regulated pilot flow from port 30 before the non-regulated pilot flow from port 34 is cut off. In its "on" position, the plug valve 60 establishes a main flow of fuel from the inlet 12 through the port 68, the plug valve chamber 66, the valve seat 74, the outlet pressure chamber 22, the main flow passage 24, the opened thermostatically operated valve 26, the main outlet 13 and the conduit leading to the main burner 14 where it is ignited by the flame of the pilot burner 16.

The main flow of fuel past the valve seat 74 is pressure regulated by the valve member 76. As is illustrated in FIG. 1, the flexible lip 78 cooperates with the valve seat to secure pressure regulation. The undercut or groove defining the flexible lip 78 provides sufficient flexibility to compensate for slight irregularities in the valve seat and for possible valve misalignment so as to improve pressure regulation control, particularly at low flow rates. For example, when the thermostatically operated valve 26 is in its "off" position, the only flow is the pilot flow of fuel to maintain a flow at the pilot burner 16 and the space between the flexible lip 78 and the bottom wall of the valve member 76 permits further flexing of the lip 78 relative to the valve seat 74.

In accordance with the present invention, the pressure of the flow past the valve seat 74 is regulated by the valve member 76. A regulated pilot flow from the outlet chamber 22 proceeds through the passageways 28, the port 30, the plug valve groove 72, the port 36, the passageway 38, the filter flow cavity 40, the pilot passageway 50, the port 52, the peripheral groove 70, the port 54, the passage 56, the passage 44, the larger flow restrictor 46, the pilot outlet 15 and the conduit leading to the pilot burner 16. With this arrangement pressure regulation is applied to the main flow of fuel for the main burner 14 and the pilot flow of fuel for the pilot burner 16. The plug valve groove 70 permits the regulated pilot flow to bypass the smaller restricting orifice 42 and be subject to the flow restriction of the larger restricting orifice 46. The relatively larger restrictor 46 is used as a pressure damper to dampen the pressure surge to the pilot burner 16 when the thermostatically operated valve 26 closes before the regulator valve 76 compensates from its main flow opening to its pilot flow opening. The orifice 46 acts to maintain the pressure of the pilot flow when the thermostatically operated valve 26 moves from a closed to an open position before the regulator valve 76 compensates from a pilot flow position to a main flow position. Of course, orifice 46 may be eliminated if desired, without affecting the general operation of the system.

The main flow of fuel in the outlet chamber 22 also proceeds through the valve stem bore 80, and the valve stem port 81 into the pressure cavity 82. Thus, the underside of diaphragm 85 is subject to a pressure force which varies in accordance with outlet pressure variations while the topside thereof is subject to a predetermined load force which is adjustable for pressure regulation above atmospheric pressure by the regulator spring 90 and adjustment screw 89. The regulator diaphragm 85, which is centrally fixed to the top of valve stem 79, effects movement of the regulating valve 76 relative to regulating valve seat 74 by sensing the outlet pressure of the fuel flow in the chamber 22; such regulatory movement compensates for pressure variations in the outlet chamber, i.e., variations from a desired pressure as set by the regulator spring 90 and adjustment screw 89. The upper diaphragm 85 defines a regulating diaphragm for the regulating assembly while the lower diaphragm 83, which has a smaller surface area when the regulating diaphragm 85 defines a balancing diaphragm that separates the inlet pressure chamber 66 from the outlet pressure chamber 82. Thus, the pressure differential across the regulating valve 76 is balanced by the pressure differential across the balancing diaphragm 83.

In all positions, the plug valve 60 has the atmospheric port 95 in registry with the outlet vent line 96 whereby the atmospheric pressure chamber 91 communicates with the atmosphere by a line traced through the orifice 92, the passage 93, the chamber 94, the atmospheric port 95, and the outlet 96 leading to the atmosphere.

FIGS. 1 and 2 show the relative positions of the control elements when the thermostatic unit 105-106 is calling for heat. Assuming now that the medium being heated by the main burner 14 attains the desired temperature as set by the knob 109, the thermostatic unit 105-106 will close the valve 26 and cut off the fuel flow to the main burner 14. The main burner 14 is subsequently cycled thermostatically in accordance with the heat requirements as sensed by the thermostatic unit 105-106 until the plug valve 60 is manually rotated to its "off" position wherein all fuel flow is cut off or to its "pilot" position wherein the main flow of fuel is cut off but the pilot flow of fuel is maintained. In the event the flame at the pilot burner 16 is extinguished, the thermocouple 17 will cool and the thermoelectric safety device 18 will cut off all fuel flow; to restart the control system, the resetting procedure outlined above must be performed and safe lighting is conventionally accomplished by means of an interlock between the plug valve dial cover 87 and the reset means whereby the reset means can be operated only when the plug valve dial cover 87 is in its "pilot" position.

Figure 7:
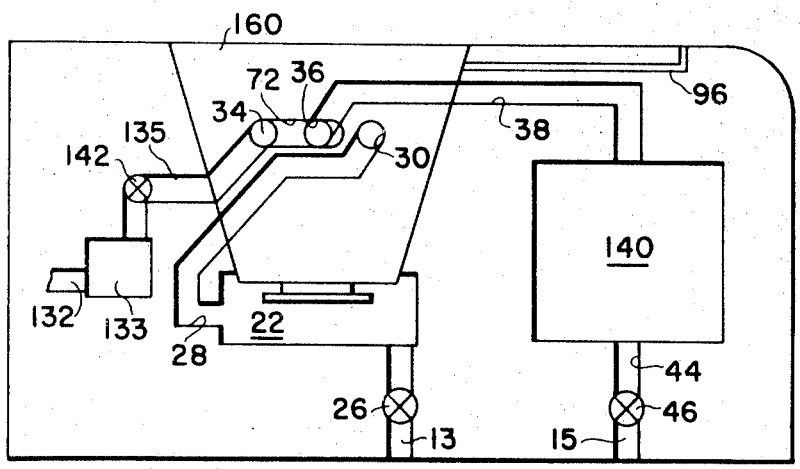
FIG. 7 is a schematic composite similar to FIG. 5 but showing a modification of the restriction for the pilot flow.

In the foregoing description of the arrangement illustrated in FIGS. 1-6, the restricting orifice 42 is located downstream of the manual plug valve 60 for the purpose of limiting the non-regulated pilot flow to a predetermined maximum. A modification of such arrangement is illustrated in FIG. 7 wherein the restricting orifice for the non-regulated pilot flow is disposed upstream of the manual plug valve 60. In the following description of the modification of FIG. 7, the same reference numerals are used for the same parts already described in connection with FIGS. 1-6, while new reference numerals are used for new parts.

As is shown in FIG. 7, a pilot flow passage 132 has one end communicating with the inlet port 12 (as in FIG. 1) and an opposite end communicating with the upstream end of a filter cavity 133 containing suitable filter material (not shown). The downstream end of the filter cavity 133 communicates with a passage 135 that includes a flow restricting orifice 142 (similar to 42 in FIGS. 1-6) and that terminates in the pilot flow port 34. The manual plug valve 160 contains porting elements 68 and 72 (FIG. 3) but peripheral groove porting 70 has been eliminated along with the bypass pilot flow path including elements 50, 52, 54 and 56.

In the "pilot" position of the plug valve 160, the peripheral groove 72 spans the two pilot flow ports 34 and 36 whereby a non-regulated pilot flow of fuel may be traced from inlet 12 through passage 132, filter 133, flow restrictor 142, passage 135, port 34, groove 72, port 36, passage 38, filter 140, passage 44 and flow restrictor 46 to the pilot outlet 15. As is the case with FIG. 5, the entire pilot flow of FIG. 7 is subject to the restricted flow of the smaller restricting orifice 142 and such flow bypasses the pressure regulator whereby a non-regulated pilot flow of fuel is supplied to the pilot burner 16 for safe lighting thereof.

Further description of structure and operation of the modification of FIG. 7 is being omitted for the sake of brevity since it is substantially the same as described in connection with FIGS. 1-6.

Inasmuch as the present invention is subject to many variations and changes in detail, it is intended that all matter contained in the foregoing description or shown on the accompanying drawings shall be interpreted as illustrative and not in a limiting sense.

What is claimed is:

1. A flow control device comprising
    a casing having inlet and outlet ports and a flow passage therebetween,
    valve means in said flow passage including a valve seat and a valve element movable relative to the valve seat,
    differential pressure operated diaphragm means,
    an operative connection between said diaphragm means and said valve element for moving the same to regulate pressure of fluid flow through said flow passage, and
    a valving member made of flexible material and including an annular ring fixed to said valve element and an annular edgewise groove on the outer periphery of said annular ring defining a flexible peripheral lip projecting radially outwardly from said annular ring beyond said valve seat, said peripheral lip flexing relative to said annular ring and to said valve seat.

2. A flow control device as recited in claim 1 wherein said valving member is disposed downstream of said valve seat.

* * * * *